No. 684,699. Patented Oct. 15, 1901.
R. McA. LLOYD.
STORAGE BATTERY.
(Application filed Feb. 15, 1901.)
(No Model.)
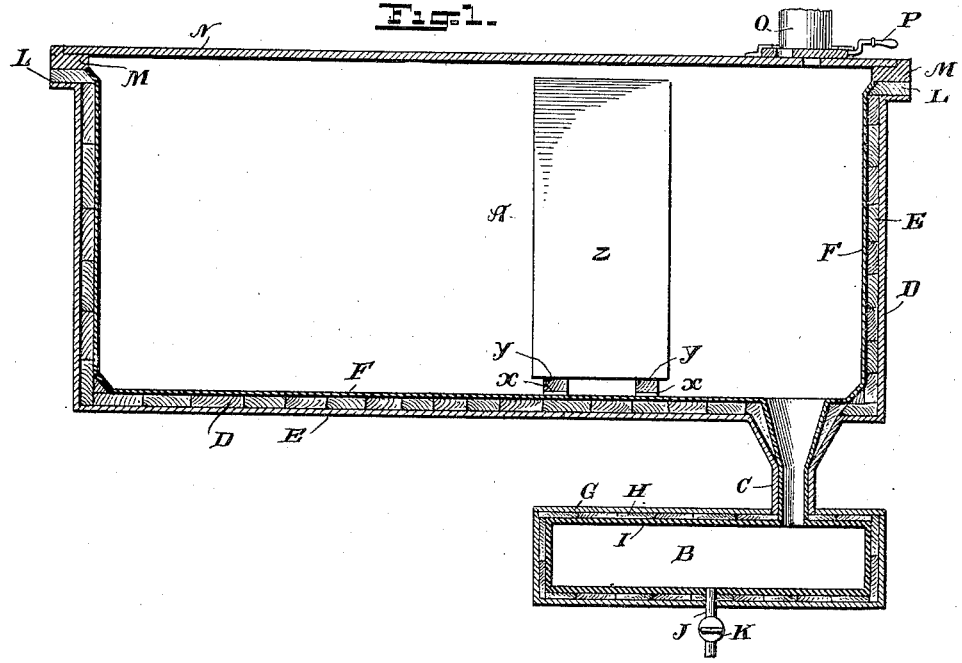
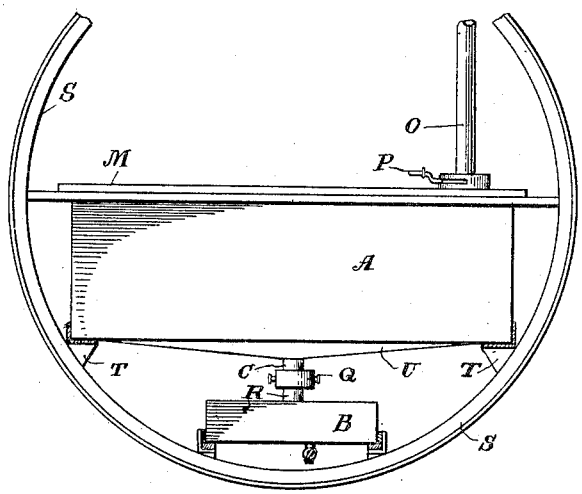
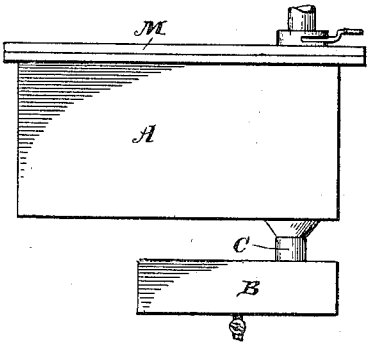
WITNESSES: INVENTOR
Robert McA. Lloyd,
BY
ATTORNEYS.

UNITED STATES PATENT OFFICE.

ROBERT McA. LLOYD, OF NEW YORK, N. Y., ASSIGNOR TO THE ELECTRIC BOAT COMPANY, OF NEW YORK, N. Y., A CORPORATION OF NEW JERSEY.

STORAGE BATTERY.

SPECIFICATION forming part of Letters Patent No. 684,699, dated October 15, 1901.

Application filed February 15, 1901. Serial No. 47,403. (No model.)

*To all whom it may concern:*

Be it known that I, ROBERT MCA. LLOYD, a citizen of the United States, residing in the borough of Manhattan, city, county, and State of New York, have invented certain new and useful Improvements in Storage Batteries and Insulation Thereof, of which the following is a full and true description, reference being had to the accompanying drawings, showing one form of my invention.

The object of my invention is to thoroughly insulate the storage battery from the machinery and from the hull or frame of the boat or other body carrying the battery, providing an insulated acid-resisting battery-compartment for containing a plurality of battery cells or jars and an insulated acid-proof tank or compartment into which solution leaked or escaped from battery-cells will collect.

My invention more especially refers to storage batteries used to operate the machinery of boats, principally submarine boats of the Holland or other type, or other structures to be used in or near water. It is of vital importance in the case of boats carrying storage batteries that the batteries shall be thoroughly insulated electrically from the machinery, frame, hull, and other metallic parts of the boats, as any electrical leakage or short-circuiting may cause current to pass through the hull, rudder, or other part of the boat to the water and cause electrolysis to be set up, with a consequent erosion of the exterior of the hull and a leakage of water into the boat. It is also of vital importance that the construction of the battery-compartment shall be exceedingly strong, adapted to withstand all shocks and strains, and for this reason the compartment will usually have a box or frame composed of iron or steel, and this increases the necessity for assuring that the frame or box shall be protected by material which is acid-resisting. Otherwise battery solution which has leaked or spilled from a battery in the compartment may find its way to the frame or box and destroy the same, or even reach the hull or machinery of the boat. The gases or fumes from such spilled or leaked acid solution alone or when acting upon corrosive metal are very unhealthful and in the case of a submarine boat might suffocate the crew or be exploded by contact with the lighting or heating apparatus or by heat generated by the machinery or by defective insulation of conductors. It is also necessary when using storage batteries confined within a battery-compartment that leaked or spilled battery solution shall not be allowed to collect within the compartment in view of the fact that the presence of a large amount of acidulated liquid is liable to cause corrosion of the metal of the compartment and may short-circuit the cells of the battery, and there is danger of arcs or sparks, which might explode gases due to agitation of the liquid.

The dangers above pointed out, especially electrical leakage, are more especially present in the case of a submarine boat, which is adapted to be submerged in and propelled through water—a most excellent conductor of electricity.

Referring to the accompanying drawings, Figure 1 is a partly-sectional view showing the construction of the battery-box and the draining box or compartment. Fig. 2 is an exterior view of the structure of Fig. 1; and Fig. 3 is a view of a modified construction, showing my improvements combined with the hull of a boat.

A is the acid-resisting battery-compartment.

B is the draining box or compartment for collecting the battery solution overflowing from batteries in the battery-compartment or which has leaked or escaped therefrom.

C is a pipe for conducting the leaking or escaping solution from the battery-compartment to the draining-box.

In the modified form of my invention shown in Fig. 3 an alarm-box Q is interposed between the battery-compartment and draining-box, and pipes C and R are employed to conduct the escaped or leaked solution through the alarm-box.

The forms of battery-compartment and draining-box shown in the drawings are those preferred by me. Other suitable forms may of course be employed.

By preference the battery-compartment A is composed of an outer box D, of steel or other metal, an interlining E, of wood or other non-conductive material, and an internal coating or lining F, of suitable acid-resisting material—as, for instance, a sheathing of lead having its joints or meeting edges soldered or otherwise made fluid-tight. The outer box D may be a continuous or pieced sheet-steel box or may be a crate-like structure or may be otherwise built, care being taken to have great strength and rigidity. The insulating-lining E may be of any suitable material or thickness; but I prefer boards of yellow pine, painted or coated with non-conductive material and with the joints or lapping edges well sealed or stopped with insulating and acid-resisting material.

L indicates wooden beams or boards over the upper edge of the steel box and constituting an insulating protection for the upper edges of the battery-compartment.

M indicates a second insulating or protecting frame, of non-conducting material, (preferably yellow pine coated with non-conductive material adapted to withstand acids,) fitted upon the frame L and recessed inwardly from its edges in order to allow the cover N of the compartment to be flush with the frame M.

O indicates a pipe carrying off gases generated in the compartment and discharging the same exteriorly of the boat's hull. Said parts, in combination with gas-exhausting means, are more especially described and claimed in an application filed by me simultaneously herewith, Serial No. 47,404, filed February 15, 1901, for Letters Patent of the United States.

The battery box or compartment may contain a plurality of battery-cells, such as Z, resting on non-conducting supports—for instance, wooden beams Y—provided with crosswise drainage-slots X to permit leaked or spilled solution to readily pass to the drainage-compartment.

In order that battery solution leaked or spilled from a battery-cell shall readily be drained from the battery box or compartment A, said compartment is provided with an opening and with a pipe C for leading the leaked or spilled solution into the drainage-box B. The pipe C is internally coated with non-conductive and acid-resisting material, such as enamel, and the pipe may be itself composed of tile or earthenware.

The drainage-box B (which may be made of any acid-resisting and insulating materials) is preferably composed of an outer steel shell G and an interlining H, of non-conductive material, such as wood, and an inner lining I, of acid-resisting material, such as sheet-lead. The accumulated battery solution may be drawn from the drainage-box by a cock J, provided with valve K.

As shown in Fig. 3, the compartment A may have an inclined bottom draining from all directions and toward the centrally-disposed pipe C. In connection with my invention an alarm device contained in a casing or enlargement of pipe C may be employed, and for an especial description of the arrangement and operation of alarm devices I refer to my pending application, Serial No. 20,375, filed June 14, 1900, for storage batteries for boats.

My invention, as hereinbefore noted, is especially useful with boats. In arranging the compartment in the boat, and especially in a submarine boat, (in which case the compartment is subjected to unusual strains,) it is desirable to build the compartment as a part of the boat in order that the battery-compartment shall not shift during the rolling or diving of the boat. While my invention is not confined to such construction, yet it is preferred, inasmuch as an independent compartment may shift and do great damage.

The battery-compartment may be provided with a cover N, which may be clamped down upon the box and rendered air or gas tight in any usual manner.

In operation if the battery solution is spilled from a battery-jar or a jar has been broken or cracked the solution will collect in the bottom of the compartment A and will run down through the pipe C and into the drainage-box B and by preference operating an alarm while passing to the drainage-box.

While I have herein shown and described preferred embodiments of my invention, yet I do not desire to be understood as confining myself to said embodiments, as obviously modifications will readily suggest themselves to skilled persons and still be within my invention.

What I claim is—

1. In combination, a battery-compartment having a body or frame and an acid-resisting lining insulated from the body or frame, and a drainage-compartment in open connection with the interior of the battery-compartment, substantially as and for the purpose described.

2. In combination, a battery-compartment having a body or frame and an acid-resisting lining insulated from the body or frame, and a drainage-compartment in open connection with the interior of the battery-compartment having a body or frame and an acid-resisting lining insulated from the body or frame, substantially as and for the purpose described.

3. In combination, an acid-resisting and insulated battery-compartment, and an acid-resisting and insulated drainage-compartment in open connection with the interior of the battery-compartment, substantially as and for the purpose described.

ROBERT McA. LLOYD.

In presence of—
  W. H. BERRIGAN, Jr.,
  JAMES J. COSGROVE.